J. L. BLACK.
SEPARATOR FOR MECHANICAL MIXTURES OF GASES.
APPLICATION FILED FEB. 19, 1906.
1,061,656.
Patented May 13, 1913.
4 SHEETS—SHEET 1.
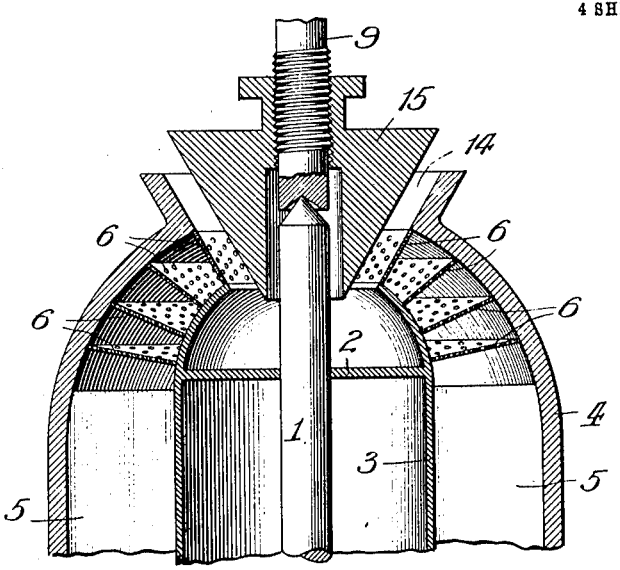
Fig. 1.
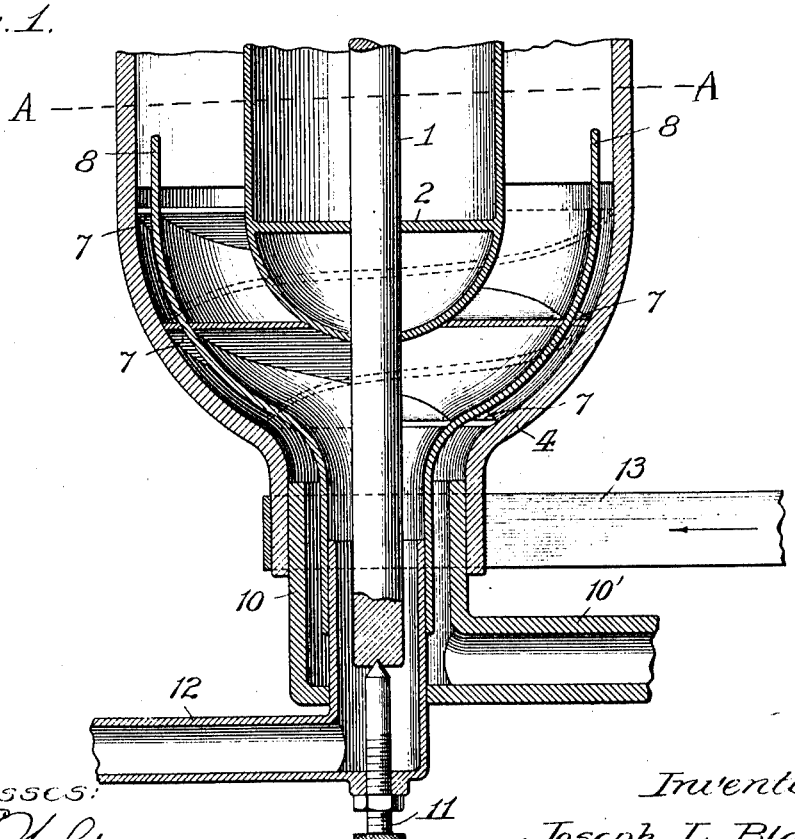
Witnesses:
Inventor:
Joseph L. Black,
By McMeen + Miller
Attys.

J. L. BLACK.
SEPARATOR FOR MECHANICAL MIXTURES OF GASES.
APPLICATION FILED FEB. 19, 1906.
1,061,656.
Patented May 13, 1913.
4 SHEETS—SHEET 2.
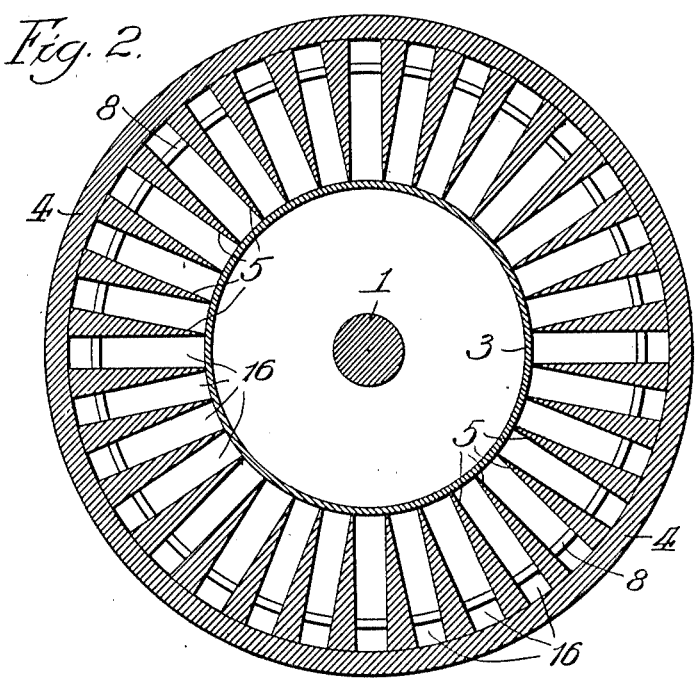
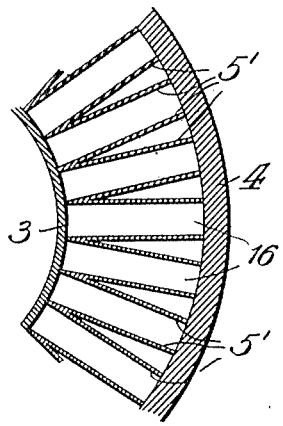
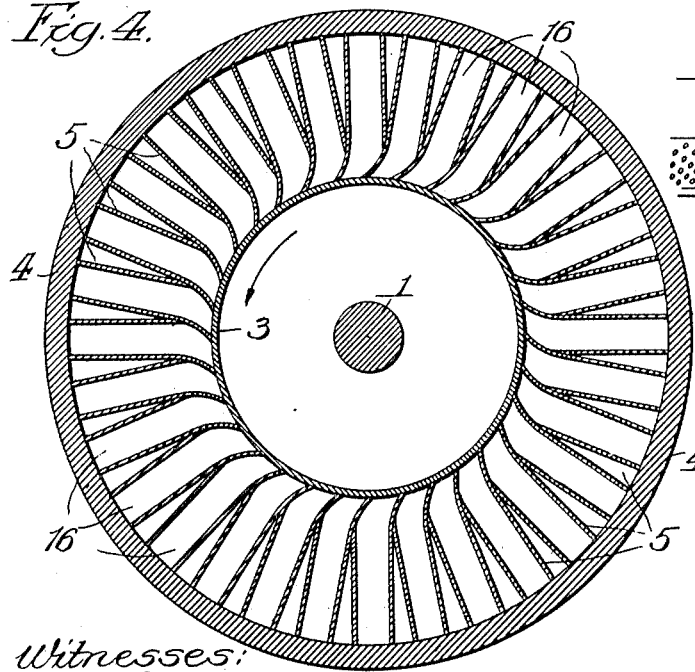
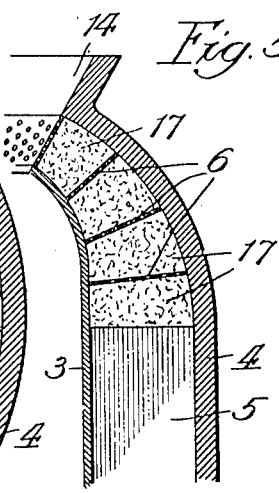
Witnesses:
Inventor:
Joseph L. Black,
By McMeen & Miller
Attys.

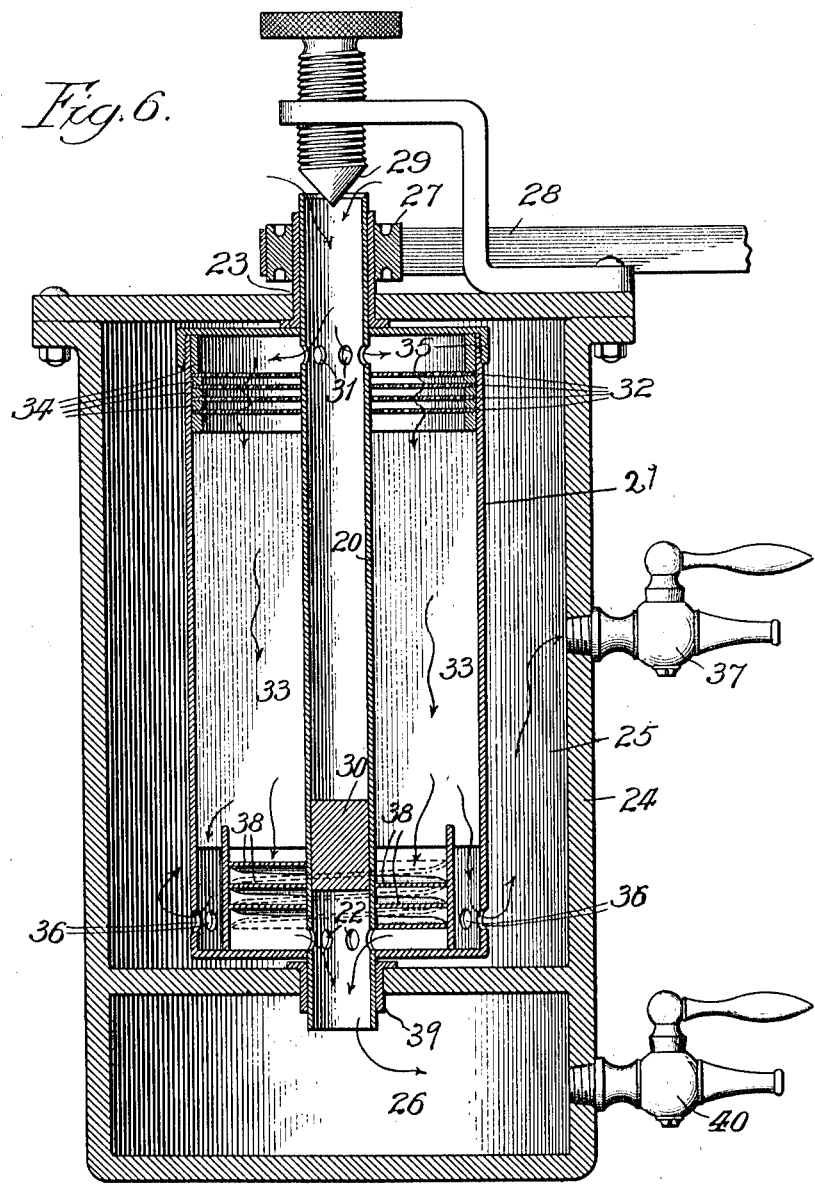

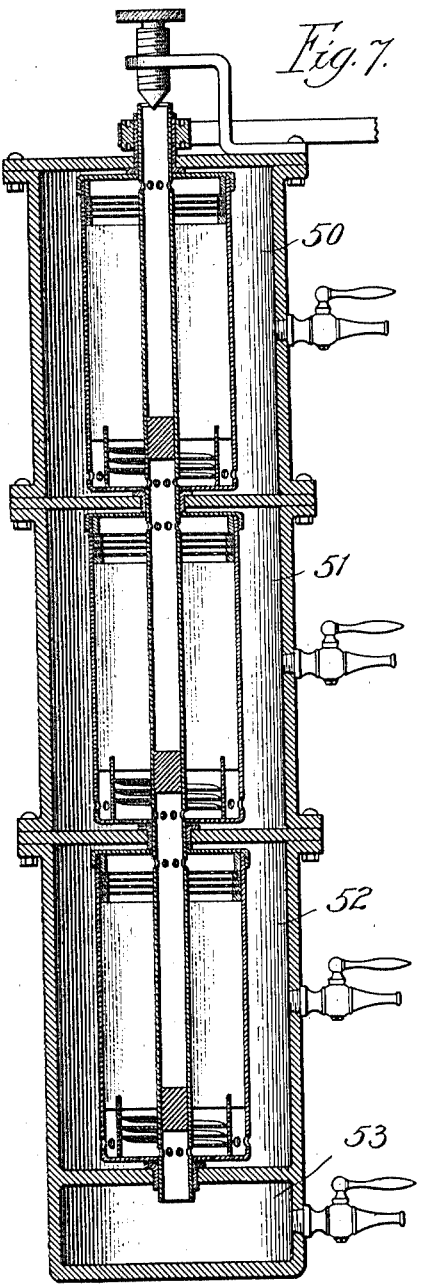
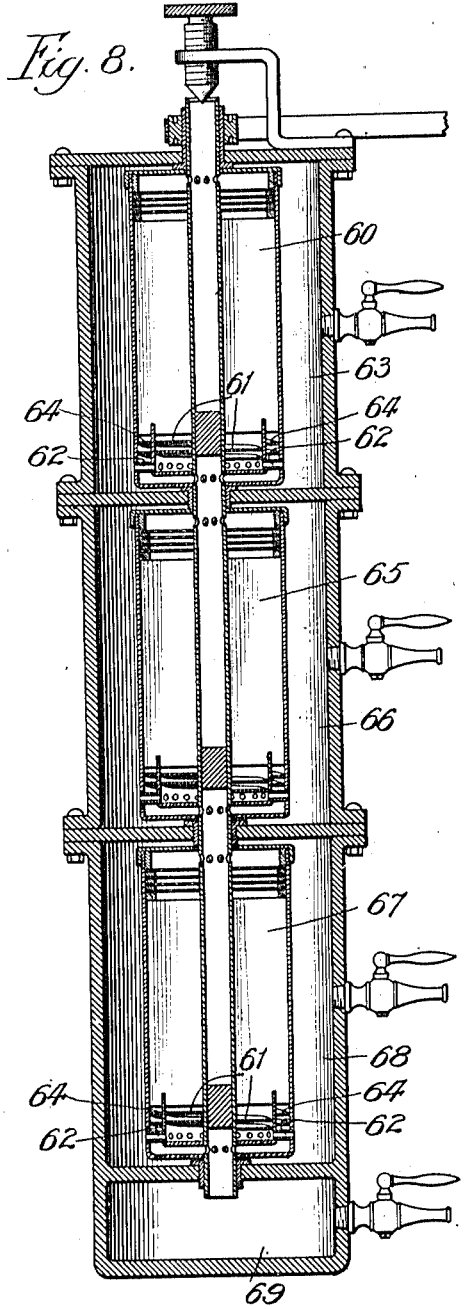

UNITED STATES PATENT OFFICE.

JOSEPH L. BLACK, OF PALATINE, ILLINOIS.

SEPARATOR FOR MECHANICAL MIXTURES OF GASES.

1,061,656.  Specification of Letters-Patent.  Patented May 13, 1913.

Application filed February 19, 1906.  Serial No. 301,785.

*To all whom it may concern:*

Be it known that I, JOSEPH L. BLACK, a citizen of the United States of America, and resident of Palatine, county of Cook, and State of Illinois, have invented a new and useful Improvement in Separators for Mechanical Mixtures of Gases, of which the following is a specification.

My invention lies in an apparatus for the separation of mechanical mixtures of gases into their constituent elements, or gases, having particularly in view the mechanical separation of ordinary air into its constituent elements, oxygen and nitrogen.

My specific intention is to separate commercially oxygen from ordinary air, but my invention is not restricted to such uses, as the same mechanism, or suitable modifications thereof, may be used for the separation of other mechanical mixtures of gases, the components whereof are of different densities.

My invention utilizes centrifugal force as the separating agent.

Eight figures of drawings accompany this specification in which:

Figure 1 shows a vertical section of a complete separator according to my invention, the central portion being broken out and both ends of the cylinder being shown; Fig. 2 shows a horizontal section of the same through its central portion, on the broken line A A of Fig. 1, the inner and outer cylinder walls, the radial vanes and the central shaft being shown in section and the edge of the dividing partition being shown in view; Fig. 3 shows a repetition of a portion of the sectional elements shown in Fig. 2, and illustrates a modification of the construction shown by Fig. 2 in the detail of the structure of the radial partitions, the solid partitions of Fig. 2 being replaced by hollow partitions in Fig. 3; Fig. 4 repeats the sectional elements of Fig. 2, and illustrates a modification of the construction of the radial partitions, the structure of each being hollow as in Fig. 3 but being further modified by curving a part thereof; Fig. 5 repeats a portion of Fig. 1 and shows a porous substance introduced between the baffle plates to assist in the action of the baffle plates; Fig. 6 shows an alternative method of construction as compared with Fig. 1; Fig. 7 shows a multiple-unit machine according to my invention, in which the lighter gases as separated by the first unit are passed to the second unit for further separation, the heavier gases being thrown out from the machine at each step; Fig. 8 shows a multiple-unit machine according to my invention, in which the heavier gases as separated by the first unit are passed to the second unit for further separation, the lighter gases being thrown out from the machine at each step.

Referring to Fig. 1 for a description of the parts of the device as illustrated in that figure; 1 is a shaft upon which the separator is built, 2 being structural webs supporting the outer parts of the revolving cylinder; the revolving cylinder consists of an inner shell 3, and an outer shell 4, rigidly connected (first) by radial partitions 5, 5, extending nearly throughout the length of the cylinder, (second) by baffle plates 6, 6, 6, 6, in the upper or inlet end of the cylinder, and (third) by spiral vanes, 7, 7, 7, 7, at the bottom or outlet end of the cylinder. A cylindrical dividing partition 8 lies within the cylinder between the inner and outer shells, being rigid with the spiral vanes and with the lower ends of the radial partitions, 5, 5.

The cylinder is supported by a cone bearing between the shaft 1 and the fixed stud 9, at the upper end, and by a journal bearing between the outer shell of the cylinder and the fixed hollow journal bearing 10, at the lower end. The downward thrust of the cylinder is carried by the adjustable stud 11, with its locknut. The cylindrical dividing partition 8 projects downwardly into the hollow bearing, 10, and a tubular duct 12 registers with it, thus providing two exits, each of annular section, for the contents of the cylinder, one lying between the shaft 1 and the dividing partition 8 and passing downwardly through the journal to find outlet through the duct 12, and the other lying between the dividing partition 8 and the outer shell 4 and passing downwardly through the journal to find outlet through the duct 10'. The cylinder is revolved by the belt 13, which is shown as utilizing as a pulley surface, a portion of the exterior surface of the outer shell 4.

Inlet for the mixed gases to the interior of the cylinder is shown at 14, being an opening through the outer shell 4 of the cylinder, the opening being conical; a conical plug 15 is threaded upon the fixed stud 9 to fit the conical opening 14, and then is withdrawn by turning the cone 15 back on the stud 9 to permit the influx of the desired quantity of the mixed gases. In the illustration, an apparatus for the separation of ordinary air is shown, and no special device for bringing the air to the inlet aperture is provided, although such may be accomplished in any well known manner, if the compound to be separated is other than the air in which the cylinder revolves.

By reference to Fig. 2, it will be seen that between the radial partitions 5, 5, are formed cells 16, 16, 16, of rectangular cross section. These are the cells in which the separation of the mixture is effected.

The operation of the device as illustrated in Figs. 1 and 2 is as follows: The cylinder is revolved rapidly by the belt 13, or by any other suitable means, and by that motion the air in the cells 16, 16, 16 is subjected to centrifugal force, resulting in the separation of the gaseous mixture into its component parts or gases, the heavier gases being thrown outward against the wall of the outer shell 4 and the lighter gases being left closer to the wall of the inner shell 3. At the same time, the effect of the spiral vanes 7, 7, is to draw the contents of the cylinder downwardly and to discharge them through the journal 10 and outlet duct 10'; in this downward movement of the contents of the cylinder, the separating partition 8 (so named herein because of the nature of its use) divides the contents of the cylinder into two annular downwardly flowing masses, one being the mass of heavy gas thrown by centrifugal force to the outer portion of each of the separating cells 16, 16, 16, and the other mass being the mass of lighter gases forced in the separating action to the inner portion of each of the separating cells. These downwardly flowing masses of separated gases pass out through the ducts 10' and 12, respectively.

The drawing away of the contained gases by the spiral vanes, 7, 7, continuously sucks the mixed gases through the inlet 14, thus making the process a continuous one. As an additional aid to the movement of the air through the cylinder, I may place spirally disposed vanes on the outside of the cylinder near the opening 14, these being so disposed as to force the outer air into this opening, and thence through the air passage 5 as already described. Just within the inlet 14, are placed the baffle-plates, 6, 6, 6, the object of which is to subdue the eddies in the mixed gases, which would ensue from the current through the entrance into the cylinder, and to permit the mixed gases to pass as smoothly as possible into the separating cells, 16, 16, 16, 16. These baffle-plates also have the desirable effect of slowing down the movement of the air into the cylinder, so that the downward passage of the air or other gases through the chamber 5, will be relatively slow in comparison with the rotary motion. By this means the downwardly passing column of air in the chamber 5 may be made subject to many revolutions of the cylinder before the upper edge of the dividing partition is reached, and thus the separation of the gases made more complete than would be the case if the movement of the gases through the chamber were too rapid. In order to more completely break up the eddy currents, and to vary the speed of the gases at will, I may employ in addition to the baffle-plates 6, 6, a packing of mineral wool, or of some other fibrous material between the baffle-plates; the baffle-plates may be made of wire gauze of any desired fineness of mesh, instead of the perforated sheet metal plates as shown.

In order to allow as much time as possible for the separation of the gases before the dividing partition 8 is reached, I make the cylinder very long in proportion to its diameter, so that the air will be subjected to many revolutions before it reaches this partition. In this case the air may be admitted more rapidly and the same degree of separation attained than would be in the case of a shorter cylinder.

In Fig. 3 is shown a preferred form of construction for the radial partitions 5, 5, 5, each partition being formed of two walls 5', 5' of light sheet metal, the wedge of space thus inclosed being sealed to prevent the circulation of gases through it.

In Fig. 4 is shown a structural form of the partitions between the separating cells. In some cases I prefer to employ the cross section shown in Fig. 4 in that portion of the revolving cylinder nearest the intake 14, and the cross section employing strictly rectangular cells, such as are shown in Figs. 2 and 3, at that portion of the cylinder nearest the outlet. The employment of a cross section having slightly curved vanes in the cylinder nearest the point of entrance of the air, aids in the drawing in of the air.

In Fig. 5 is shown a detail of the baffle-plates shown in Fig. 1, the spaces between the baffle plates being, as has already been described, shown filled with a material 17, through which the gas mixture may percolate, such as mineral wool, asbestos, curled hair, cotton or the like. Such a material would effectually break up the eddies caused by the passage of the mixed gas into the cylinder, and would assure the rotational speed of the mixture before it is passed into the separating cells 16, 16.

In Fig. 6 is shown a machine constructed in accordance with my invention and provided with means for controlling to a greater extent than is shown in Fig. 1, the action which is taking place continuously in the separating cylinder. 20 is a tubular shaft upon which the separating cylinder 21, is rigidly mounted, the tubular shaft being journaled at 23 and 39 in the inclosing case 24; the inclosing case 24 contains two chambers 25 and 26, in one of which, 25, is mounted the separating cylinder 21. The pulley 27 is mounted upon the tubular shaft 20, and the separating cylinder is driven by the belt 28. The mixed gases are drawn in through the upper end of the tubular shaft 20, the influx being governed by the conical adjustable plug 29. The tubular shaft is plugged at 30, and the mixed gases pass from the tubular shaft through the openings 31, 31 into the separating cylinder, thence through the baffle-plates 32, 32 into the separating cells inclosed by the radial partitions 33, 33. The baffle-plates 32, 32 are held in place by the rings 34, 34, all being released for inspection or removal by taking off the screw cap 35; fibrous or pervious material as heretofore described, may be placed between the baffle-plates if so desired. When the machine is in operation, the heavier gases are blown by the centrifugal force through the openings 36, 36, into the chamber 25, and thence, by the pressure of the inflowing gas, through 36, 36, tending to flow through the cock 37; the lighter gases are drawn by the spiral vanes to the lower end of the separating cylinder, where they are forced through the openings 22, 22, into the tubular shaft, finding vent into the chamber 26, and thence they tend to flow through cock 40. It will be seen that the stop cocks 37 and 40 regulate the amount of gas permitted to flow through the openings 36, 36 and 22, 22, respectively, and thereby may be a controlling element in the degree of separation attained by the machine.

In Fig. 7 is shown a multiple unit machine, the successive chambers, 50, 51, 52, containing each an exact duplicate of the separating cylinder of Fig. 6, the cylinders being all built upon one tubular shaft. In the operation of this multiple-unit machine, the mixed gas passes into the upper end of the shaft, undergoes one separation in the separating cylinder of chamber 50, the heavier gas being thrown out into the chamber 50 and the lighter gas being passed back into the tubular shaft and through into the separating cylinder of chamber 51 where a second separation or refinement occurs, the heavier constituents being thrown out into chamber 51, and the lighter gas passed back into the tubular shaft, and thence through the separating cylinder of chamber 52 in similar manner, the thrice refined lighter gas finally being available through the cock in chamber 53. By use of the cocks provided for various chambers, 50, 51, 52, 53, the separation in the three separating cylinders may be controlled to a great degree.

In Fig. 8 is shown a modification designed to refine continuously the heavier gas of the compound. In this machine the mixture enters 60 in the same manner as in the previously described machines, but in passing from this cylinder the lighter gas is drawn by the spiral vanes 61, 61 and passes through the radial tubes 62, 62, into the chamber 63, while the heavier gas is drawn by similar spiral vanes, 64, to the bottom of the cylinder and there forced through the holes into the tubular shaft, thence passing to the second separating cylinder 65 in chamber 66; in the same manner as in cylinder 60, the lighter gas is passed into chamber 66 and the heavier gas is passed into the tubular shaft, and thence into the succeeding separating cylinder 67 where another separation or refinement occurs, the lighter component being passed into the chamber 68, and the heavier gas, now thrice refined, is passed into the chamber 69, whence it may flow through the cock shown.

It has been found in practice that with a revolving drum having a radius of forty centimeters and a rotating speed of one thousand revolutions per minute the best results are obtained when applied to the constituents of coal gas; a higher speed of rotation will of course effect a more complete separation. With a drum of smaller radius the mechanical difficulties due to lack of strength of structural materials are lessened; with a revolving drum six inches in diameter and properly designed bearings a speed of 15,000 revolutions per minute may be obtained, with an even more complete mechanical separation of gases than in the case of the larger drum above cited.

Having thus described my invention, what I claim as new and desire to secure by United States Letters Patent is:

1. In a centrifugal gas-separating device, a rotating cylinder, an inlet to said cylinder for mixed gases, two outlets for separated gases, separating cells in said cylinder, and wedge-shaped partitions between said separating cells, substantially as described.

2. In a centrifugal gas-separating device, a rotating cylinder, an inlet to said cylinder for mixed gases, two outlets for separated gases, separating cells in said cylinder, and partitions between said separating cells, said partitions being wedge-shaped and said separating cells being substantially parallelograms in cross section, substantially as described.

3. In a centrifugal gas-separating device, a rotating cylinder, an inlet to said cylinder for mixed gases, two outlets for separated gases, separating cells in said cylinder, and partitions between said separating cells, said cells being radial and the two sides of each of said cells being parallel, substantially as described.

4. In a centrifugal gas-separating device, a rotating cylinder, an inlet to said cylinder for mixed gases, a separate outlet from said cylinder for each of a plurality of separated gases, longitudinal partition walls in said cylinder, said walls being approximately radial, longitudinal separating cells formed by said walls, each of said cells being formed by wall-surfaces approximately parallel, substantially as described.

5. In a centrifugal gas-separating device, a rotating cylinder, an inlet to said cylinder for mixed gases, a separate outlet from said cylinder for each of a plurality of separated gases, separating cells in said cylinder, and partitions between said separating cells, said partitions being wedge-shaped and forming parallel sides for said separating cells, substantially as described.

6. In a centrifugal gas-separating device, a separating cylinder, means for revolving said cylinder upon its axis, an inlet into said separating cylinder consisting of a circular opening concentric with the axis of said cylinder, and a stationary but adjustable obstruction before said inlet opening to regulate the flow of gas, substantially as described.

7. In a centrifugal gas-separating device, a separating cylinder, means for revolving a said cylinder upon its axis, an inlet into said separating cylinder consisting of a circular opening concentric with the axis of rotation of said cylinder, and an adjustable means for controlling the flow of gas through said inlet opening, said means consisting of adjustable but normally motionless parts mounted at the inlet to said cylinder but not integral with said cylinder, substantially as described.

8. In a centrifugal gas-separating device, a separating cylinder, means for driving said separating cylinder, separating cells in said cylinder, an inlet for gases into said cylinder and thence into said separating cells, and baffle plates in said separating cylinder whereby eddies in the inflowing current of gases may be subdued before the inflowing gases enter the separating cells, substantially as described.

9. In a centrifugal gas-separating device, a separating cylinder, means for driving said separating cylinder, separating cells in said cylinder, an inlet for gases into said cylinder and thence into said separating cells, and means in said separating cylinder whereby eddies in the inflowing current of gases may be broken up before the inflowing gases enter the separating cells, substantially as described.

10. In a centrifugal gas-separating device, a separating cylinder, separating cells in said cylinder, an inlet for gases into said cylinder and cells, and means whereby eddies in the inflowing current of gases are broken up, substantially as described.

11. In a centrifugal gas separating device, a rotating hollow cylinder, radial partitions in said hollow cylinder, a concentric partition within said cylinder for dividing the centrifugally separated gases, an inlet to said cylinder for mixed gases, two outlets from said cylinder for said separated gases, and means for rotating said cylinder at high speed, substantially as described.

Signed by me at Chicago, county of Cook, and State of Illinois, in the presence of two witnesses.

JOSEPH L. BLACK.

Witnesses:
KEMPSTEE B. MILLER,
EVA A. GARLOCK.